July 20, 1948.  M. B. SIEBRING  2,445,698
PLANTER

Filed Dec. 29, 1945  2 Sheets-Sheet 1

MAURICE B. SIEBRING INVENTOR.

BY *Martin E. Anderson*
ATTORNEY.

July 20, 1948.  M. B. SIEBRING  2,445,698
PLANTER

Filed Dec. 29, 1945  2 Sheets-Sheet 2

MAURICE B. SIEBRING INVENTOR.

BY *Martin E. Anderson*
ATTORNEY.

Patented July 20, 1948

2,445,698

UNITED STATES PATENT OFFICE 2,445,698

PLANTER

Maurice B. Siebring, Kersey, Colo.

Application December 29, 1945, Serial No. 638,301

3 Claims. (Cl. 111—77)

This invention relates to improvements in planters and has reference more particularly to planters of the type employed in planting segmented beet seeds and other small seeds that must be spaced equal distances apart and a given distance below the surface of the soil.

In order to get the highest possible percentage of germination, it is necessary for the seeds to come into contact with moist soil and this is true more particularly in the arid regions of our country where the rainfall is below normal.

Where beet seeds, for example, are dropped into an open furrow, they nearly always come in contact with dry powdered soil which rolls down the furrow sides and as a result they are kept dry for a considerable time, which retards germination.

It is the object of this invention to produce a planter, for the purpose indicated, that shall be so constructed that the seeds will be deposited in direct contact with the moist soil and in exact predetermined spaced relation.

Another object of the invention is to produce a beet seeder of a very simple and substantial construction that can be attached for traction purposes to an ordinary cultivator.

A further object of the invention is to produce a seeder of the type mentioned that can readily be adjusted as to the depth at which the seeds are planted and which shall be provided with a substantial furrow opener and a presser wheel following directly behind the planter so as to prevent the dry powdered soil that may be on the surface, from rolling into the furrow and coming in contact with the seed.

A further object of the invention is to produce a seeder of the type mentioned, in which the seed hopper can be readily moved away from the seed carrying disk for the purpose of cleaning.

A further object of the invention is to produce a machine of the type described in which the parts can be readily adjusted to compensate for wear or for variations in the depth of seed bed desired.

The above and any other objects that may become apparent as the description proceeds are obtained by means of a construction and an arrangement of parts that will now be described in detail and for this purpose reference will be had to the accompanying drawings in which the invention has been illustrated in its preferred form and in which.

Figure 1:
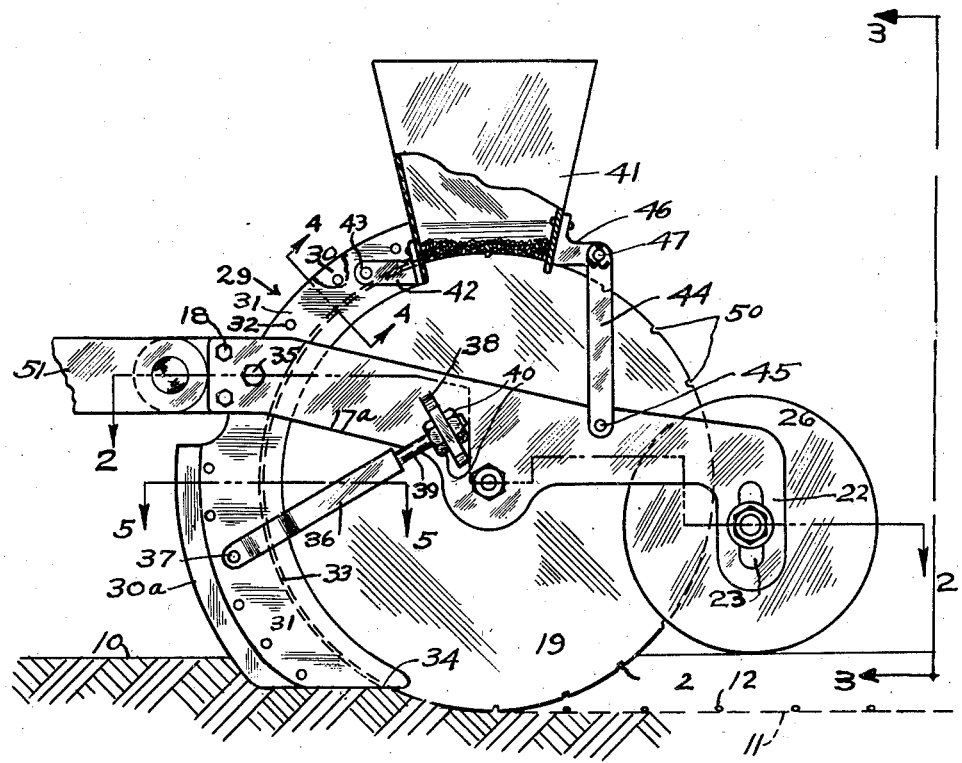
Figure 1 is a side elevation of the planter with portions thereof broken away to better disclose the construction.

In the drawing line 10 designates the upper surface of the soil and line 11 indicates the level of the seed bed, while the seeds have been designated by reference numeral 12. The planter consists of a frame which has been illustrated as comprising a steel casting 13 that has a hub provided with a transverse bearing 14 for the reception of a pivot pin 15. The part 13 has been shown as provided with rearwardly extending lugs 16. Frame members 17 and 17a are secured to the lugs by means of bolts or rivets 18 or by other equivalent means. Positioned between the frame members is a disk 19 that has a hub 20 mounted for rotation about an axle that has been indicated by reference numeral 21. In the embodiment illustrated, the axle has been shown as an ordinary bolt but it is to be understood that any of the usual antifriction or cone bearings can be employed in this construction.

Figure 2:
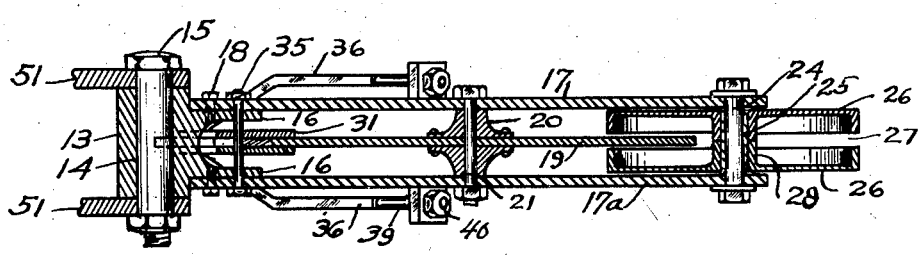
Figure 2 is a section taken on line 2—2, Figure 1.
Figure 3:
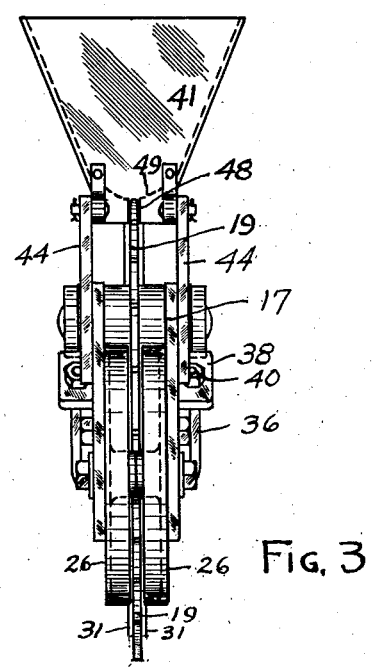
Figure 3 is a rear elevation looking through plane 3—3, in Figure 1.
Figure 4:
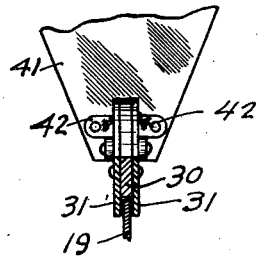
Figure 4 is a section taken on line 4—4, Figure 1.
Figure 5:
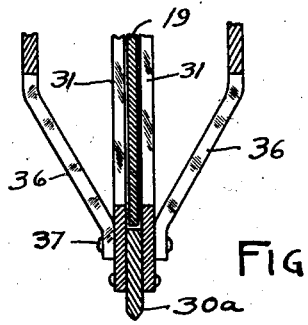
Figure 5 is a section taken on line 5—5, Figure 1.

The rear ends of the frame members have downwardly extending portions 22 that are provided with vertical slots 23. An axle that has been designated by reference numeral 24 extends through the slots 23 and carries a sleeve 25 that forms a bearing for the two presser wheels that have been designated by reference numerals 26. It will be seen from Figure 2 that the presser wheels have their peripheral surfaces spaced apart forming an opening 27 of a width slightly greater than the thickness of disk 19 so that they may overlap the disk in the manner shown. In the present embodiment the spacing is effected by having hubs 28 extend beyond the inner edges of the peripheral surfaces but any other suitable construction can be substituted providing it performs the same function in substantially the same manner.

An arcuate guide 29 is positioned along the front of the rotating disk 19 and, in the present embodiment, consists of an arcuate plate 30 whose inner edge is curved on the same radius as the periphery of the disk so as to fit quite closely against the latter. Other arcuate plates, like those designated by reference numeral 31, are positioned on opposite sides of plate 30 and secured to the latter by means of rivets or bolts 32. Plates 31 overlap the rotating disk 19 and their inner edges have been designated by reference numeral 33. Arcuate plate 30 may be formed of two pieces, the one designated by reference numeral 30a being preferably formed from hard steel and of a width greater than the width of the plates 31 so as to extend to the front of the latter. Plate 30a is preferably sharpened and this, together with the lower ends of plates 31, form a furrow opener as shown in Figure 1.

Attention is called here to the fact that the furrow opener cuts a furrow that is only slightly wider than the thickness of the disk and consequently does not permit dry soil particles to fall. The center plate 30a terminates at point 34 and it will therefore be seen that the guide and furrow opener extends and covers almost 180 degrees of the front peripheral edge of the disk. The guide has been shown as connected to the frame by means of bolt 35 that extends through parts 16 and the front ends of the frame members. In order to adjust the position of the guide so as to hold it rigidly in a fixed position relative to the disk, bars 36 have been provided on opposite sides. The front ends of these bars have been shown as pivotally connected to the guide at 37.

Frame members 17 and 17a have been shown as provided with outwardly extending lugs 38 that are perforated for the reception of the cylindrical extensions 39 of bars 36. By means of nuts 40 the guide can be adjusted relative to the peripheral edge of the disk.

A seed hopper, which has been designated by reference numeral 41, is provided with forwardly extending brackets 42 that are pivoted to the upper end of the guide at 43. The seed hopper can swing about pivot 43 but is held in operative position by means of two bars 44, one on each side of the disk, which are pivotally connected with the frame members at 45. The seed hopper has rearwardly extending brackets 46 that are provided with openings for the reception of pins 47 by means of which the brackets are connected with the upper ends of bars 44. Before the hopper can be turned about its pivot 43, pins 47 must first be removed.

The seed hopper is provided in its bottom with a slot 48 of a width sufficient to admit the edge of the disk. The inner surface of the seed hopper is curved inwardly at the bottom as indicated by reference numeral 49 so as to direct the seeds towards the top of the disk. The disk is provided with a plurality of notches 50 of the proper size to receive one segmented beet seed. These notches are spaced apart the distance that the seeds are to be spaced in the furrow. It may be mentioned here that disks having different notch spacings may be provided where the seeder is to be used for planting seeds that require different spacings. Where segmented beet seeds are planted, the spacings are usually two inches apart and since only a single seed is planted at each point, the notches must be large enough to accommodate one seed and too small for two seeds.

Let us now assume that the seeder that has been illustrated on the drawing and described above is connected with a tractor implement such as a cultivator by means of links 51, which are adjusted a proper distance above the ground surface. When the tractor moves forwardly, the furrow opener comprising plates 30a and 31 will open a furrow to about one-third or one-half the depth desired for the seed. The depth to which the furrow is cut and to which the seeds are planted is determined by the position of the presser wheel which can be adjusted in the manner above indicated.

The friction between the sides of the furrow and the sides of disk 19 which it will be observed extends into the soil below the furrow opener is sufficient to cause the disk to rotate at a peripheral speed equal to the speed at which the seeder is moved forwardly. When the upper peripheral edge of the disk moves through the seed hopper, seeds will find lodgement in the notches as they move through the hopper and underneath the seeds. After a notch containing a seed has passed beyond the hopper, the seed will be retained in place by the inner arcuate surface of plate 30 and will be kept from transverse movement by the overlapping plates 31. When the seed arrives at a point below the furrow opener, the disk will press it into direct contact with the moist soil and leave it on the bottom of the groove cut by the disk where it will adhere to the soil. The seeds are deposited and left in the seed furrow and spaced corresponding to the spacing of the notches 50. The notches are preferably so constructed that the following edges are slightly inclined so as to facilitate the release of the seed.

The presser wheel follows closely the disk and closes the furrow forcing the soil against the newly deposited seeds. In the present embodiment the presser wheel has been shown as overlapping the seed disk, but it may be spaced farther to the rear, if desired and may, in fact, be so positioned as not to overlap, although the overlapping arrangement is believed to be advantageous for the reason that it is desirable to close the furrow as soon as possible to prevent dry powdered soil from falling into it.

Attention is called to the fact that the part referred to above as "the furrow opener" merely cuts a shallow groove which is always less than the depth to the lowermost peripheral point of the disk. This gives increased friction between the sides of the disk and the soil and provides a narrow groove not exceeding the thickness of the disk, into which dry powdered soil can not penetrate.

The thickness of the disk must correspond to the size of the seed and consequently if peas or beans are planted the disk must be thicker than for segmented beet seeds.

Having described the invention what is claimed as new is:

1. A seed planter comprising, in combination, a frame having its front end provided with a bearing block adapted to be connected with a tractor device, two spaced frame members extending rearwardly from the bearing block, a circular seed disk mounted between the frame members for rotation about an axis carried by them, an arcuate guide positioned between the frame members and to the front of the seed disk, the lower end of said guide forming a furrow opener, the concave surface of the guide having a groove of a width to receive the seed disk and of a curvature substantially the same as the periphery of the seed disk, means securing the guide to the frame in position to receive the periphery of the disk in the groove, the guide embracing the edge of the disk through an angle of substantially 135 degrees, a seed hopper connected with the upper end of the guide and with the frame, the bottom of the seed hopper having a slot of the proper width to receive the edge of the disk, the latter having its peripheral edge provided with spaced seed receiving notches, the frame members extending to a point to the rear of the disk, and a presser wheel mounted for rotation between the rear ends of the frame members in position to engage the soil surface and close the furrow.

2. A seed planter comprising, in combination, a frame having its front end provided with a bearing block adapted to be connected with a tractor device, two spaced frame members extending rearwardly from the bearing block, a circular seed disk mounted between the frame members for rotation about an axis carried by them, an arcuate guide positioned between the frame members and to the front of the seed disk, the lower end of the guide forming a furrow opener, the concave surface of the guide having a groove of a width to receive the seed disk and of a curvature substantially the same as the periphery of the seed disk, means securing the guide to the frame in position to receive the periphery of the disk in the groove, the guide embracing the edge of the disk through an angle of substantially 135 degrees, a seed hopper pivotally connected with the upper ends of the guide and means connecting the hopper with the frame, the bottom of the seed hopper having a slot of the proper width to receive the edge of the disk, the latter having its peripheral edge provided with spaced seed receiving notches, the frame members extending to a point to the rear of the disk, and a presser wheel mounted for rotation between the rear ends of the frame in position to engage the soil surface and close the furrow.

3. A seed planter comprising, in combination, a frame having its front end provided with a bearing block adapted to be connected with a tractor device, two spaced frame members extending rearwardly from the bearing block, a circular seed disk mounted between the frame members for rotation about an axis carried by them, an arcuate guide positioned between the frame members and to the front of the seed disk, the concave surface of the guide having a groove of a width to receive the seed disk and of a curvature substantially the same as the periphery of the seed disk, means securing the guide to the frame in position to receive the periphery of the disk in the groove, the guide embracing the edge of the disk through an angle of substantially 135 degrees, the lower end of the guide forming a furrow opener, a seed hopper connected with the upper end of the guide and with the frame, the bottom of the seed hopper having a slot of the proper width to receive the edge of the disk, the latter having its peripheral edge provided with spaced seed receiving notches, the frame members extending to a point to the rear of the disk, a presser wheel mounted for rotation between the rear ends of the frame in position to engage the soil surface and close the furrow cut therein by the guide, and means for adjusting the position of the presser wheel pivot vertically with respect to the seed disk pivot for controlling the depth of the seedbed.

MAURICE B. SIEBRING.

REFERENCES CITED

The following references are of record in the file of this patent:

UNITED STATES PATENTS

| Number | Name | Date |
| --- | --- | --- |
| 427,612 | Reese et al. | May 13, 1890 |
| 924,204 | Thurmond | June 8, 1909 |
| 2,192,947 | White | Mar. 12, 1940 |
| 2,417,931 | Hipple | Mar. 25, 1947 |